United States Patent
Zhou et al.

(10) Patent No.: US 9,537,714 B1
(45) Date of Patent: Jan. 3, 2017

(54) RANDOMIZED ROTATION STRIPING FOR DIRECT CONNECT NETWORKS

(71) Applicant: Google Inc., Mountain View, CA (US)

(72) Inventors: Junlan Zhou, Sunnyvale, CA (US); Amin Vahdat, Los Altos, CA (US); Peter Peresini, Banska Bystrica (SK)

(73) Assignee: Google Inc., Mountain View, CA (US)

(*) Notice: Subject to any disclaimer, the term of this patent is extended or adjusted under 35 U.S.C. 154(b) by 184 days.

(21) Appl. No.: 14/327,050

(22) Filed: Jul. 9, 2014

Related U.S. Application Data

(60) Provisional application No. 61/991,313, filed on May 9, 2014.

(51) Int. Cl.
*H04L 12/751* (2013.01)
*H04L 12/24* (2006.01)

(52) U.S. Cl.
CPC ......... *H04L 41/084* (2013.01); *H04L 41/0813* (2013.01); *H04L 41/0823* (2013.01); *H04L 41/0883* (2013.01); *H04L 41/145* (2013.01)

(58) Field of Classification Search
CPC ............... H04L 41/084; H04L 41/0813; H04L 41/0823; H04L 41/0883; H04L 41/145
See application file for complete search history.

(56) References Cited

U.S. PATENT DOCUMENTS

| | | | | |
|---|---|---|---|---|
| 2011/0176804 A1* | 7/2011 | Blinkert | ................. | G02B 6/356 398/45 |
| 2012/0008945 A1* | 1/2012 | Singla | ................. | H04J 14/0204 398/49 |
| 2012/0182865 A1* | 7/2012 | Andersen | ................. | H04L 1/22 370/228 |

FOREIGN PATENT DOCUMENTS

WO  WO 2013/091688 A1 * 6/2013 .......... H04J 14/0227

OTHER PUBLICATIONS

Dictionary.com, "Definition of Natural Number", [retrieved on Aug. 23, 2016]. Retrieved from the Internet: <http://www.dictionary.com/browse/natural—number?s=t>.*
Dictionary.com, "Definition of Controller", [retrieved on Aug. 18, 2016]. Retrieved from the Internet: <http://www.dictionary.com/browse/controller?s=t>.*

* cited by examiner

*Primary Examiner* — Brian J Gillis
*Assistant Examiner* — Amy Ling
(74) *Attorney, Agent, or Firm* — McDermott Will & Emery LLP

(57) ABSTRACT

The present disclosure presents a system and method for determining a logical topology of a network, given the network's physical topology. More particularly, a logical topology is implemented across a plurality of optical circuit switches that interconnect the nodes of a network. Each of the optical circuit switches includes an initial internal configuration. The internal configuration of the optical circuit switches are swapped to generate new logical topologies. A fitness is determined for each of the generated topologies. The fitnesses of the topologies are then ranked and the most fit logical topology is implemented in the network.

18 Claims, 5 Drawing Sheets

RANDOMIZED ROTATION STRIPING FOR DIRECT CONNECT NETWORKS

CROSS-REFERENCE TO RELATED APPLICATIONS

This application claims priority to U.S. Provisional Application No. 61/991,313, filed on May 9, 2014 and titled "Randomized Rotation Striping for Direct Connect Networks," which is incorporated by reference herein in its entirety.

BACKGROUND OF THE DISCLOSURE

Cloud computing and its applications are effecting a qualitative shift in the way people communicate and share information. The underlying computer networks that support cloud computing can be divided into two major categories: intra-datacenter and inter-datacenter. Intra-datacenter networks interconnect the computing infrastructure (servers, disks) within the same building or among different buildings of a datacenter campus. Inter-datacenter networks connect multiple datacenters distributed at different geographic locations. Many modern high-speed data links use optical transmission technologies via optical fibers for both intra- and inter-datacenter networks.

SUMMARY

According to one aspect of the disclosure, a method for configuring a network includes providing a network. The network includes a plurality of fabric nodes and a plurality of optical switches. Each of the plurality of fabric nodes are connected to each of the other plurality of fabric nodes through the plurality of optical switches. The method also includes establishing a first logical topology candidate for the network. The first logical topology candidate includes a respective switch configuration for each of the plurality of optical switches. Each switch configuration indicates the internal interconnection between each of a plurality of ports of the switch. The method also includes determining a first fitness of the first logical topology candidate. The method also includes establishing a second logical topology candidate for the network by exchanging a switch configuration of a first optical switch of the plurality of optical switches with a switch configuration of a second optical switch of the plurality of optical switches. A second fitness of the second logical topology candidate is determined. A network topology is implemented responsive to a comparison of the first fitness with the second fitness.

According to another aspect of the disclosure, a system for configuring a network includes a network. The network includes a plurality of fabric nodes and a plurality of optical switches. Each of the plurality of fabric nodes are connected to each of the other plurality of fabric nodes through the plurality of optical switches. The system also includes a controller coupled to each of the plurality of optical switches. The controller is configured to establish a first logical topology candidate for the network. The first logical topology assigns a respective switch configuration to each of the plurality of optical switches. Each switch configuration indicates the internal interconnection between each of a plurality of ports of each of the switches. The controller is also configured to determine a first fitness of the first logical topology candidate and then establish a second logical topology candidate for the network. The second logical topology candidate is established by exchanging a switch configuration of a first optical switch of the plurality of optical switches with a switch configuration of a second optical switch of the plurality of optical switches. The controller is also configured to determine a second fitness of the second logical topology candidate. The controller then implements a network topology responsive to a comparison of the first fitness with the second fitness.

BRIEF DESCRIPTION OF THE DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Figure 1:
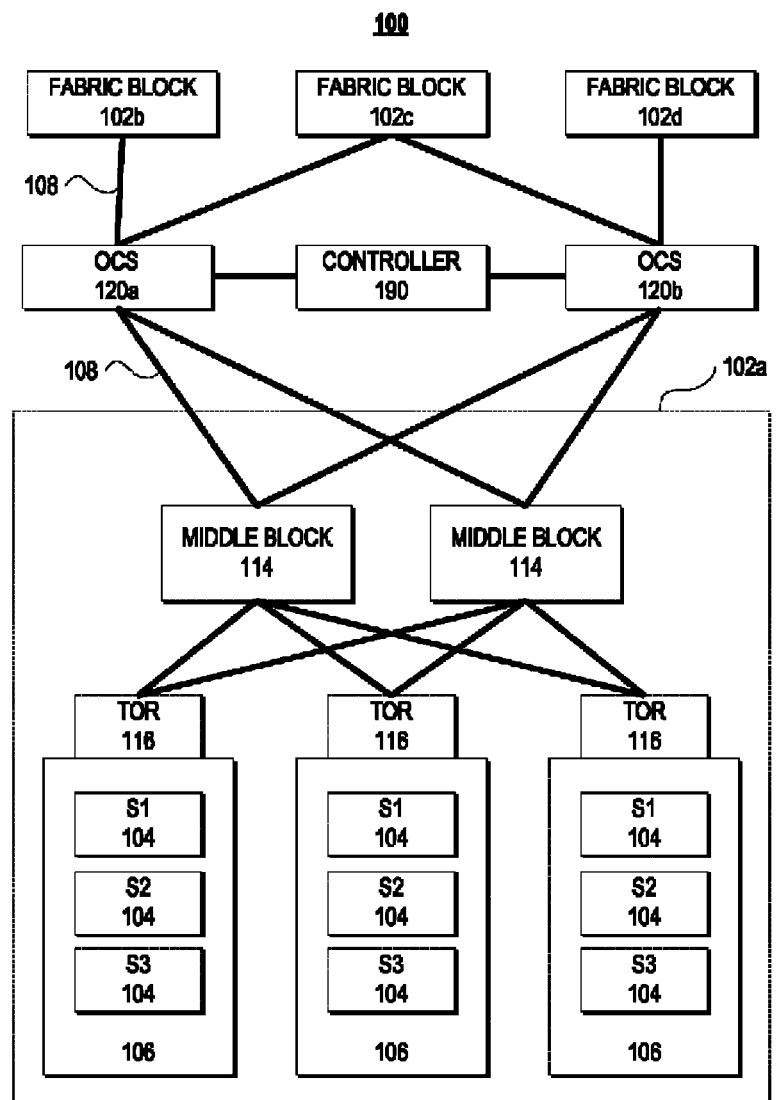
FIG. 1 illustrates a block diagram of an example datacenter.

FIG. 1 illustrates a block diagram of an example datacenter 100. The datacenter 100 includes several interconnected fabric blocks 102. Each fabric block 102 may include hundreds, and in some implementations over one thousand, servers 104 arranged in server racks 106. The fabric blocks 102 are communicatively coupled to one another by optical and/or electrical communication links 108. In some implementations, each of the links 108 represents a plurality of fibers coupling the fabric blocks 102. The fabric blocks 102 can be connected directly, or through optical circuit switches (OCSs) 120, which serve as switches for routing data communications between the fabric blocks 102. The plurality of OCSs 120 is configured by the controller 190. The fabric blocks 102 include one or more middle blocks 114 to route communications among the racks 106 included in the fabric block 102 and for routing data communications between the fabric block 102 and the OCSs 120. FIG. 1 illustrates a fabric block 102 having three server racks 106 and two middle blocks 114. However, in other implementations, a fabric block 102 may include any number of server racks 106 and middle blocks 114. For simplicity, each middle block 104 is shown as having a single connection to each OCS 102. However, in some implementations, each fabric block 102 may have any number of connections to a single OCS 120. In some implementations, the middle blocks 114 and server racks 106 of each fabric block 102 may not be physically contained within the same housing. Instead, each fabric block 102 can be logically defined as a group of all middle blocks 114 and server racks 106 that are interconnected, regardless of their relative position or proximity to each other within the datacenter. In some implementations, each fabric block 102 includes an equal number of middle blocks 104.

The datacenter 100 includes a plurality of fabric blocks 102 interconnected by OCSs 120. The fabric blocks 102 and OCSs 120 of the datacenter 100 can be modeled as a computer network consisting of two switch stages: a first switch stage including fabric blocks 102, and a second switch stage including OCSs 120. Communication between fabric blocks 102 is facilitated by the OCSs 120, and there are no direct connections between any two switches in the same stage. Each OCS 120 can serve as a patch panel for routing communications between fabric blocks 102. In some implementations, an OCS 120 can be configured to connect any of its input ports to any of its output ports. Therefore, a given OCS 120 can be configured to send data received from any fabric block 102 to any other fabric block 102 that is connected to the OCS 120. For example, OCS 120a is coupled to Fabric Block 102a, Fabric Block 102b, and Fabric Block 102c. Therefore, OCS 120a could route data received from Fabric Block 102a to either Fabric block 102b or Fabric Block 102c. However, because OCS 120a is not coupled to Fabric Block 102d, OCS 120a cannot route data received from Fabric Block 102a directly to Fabric Block 102d. Instead, to route data from Fabric Block 102a to Fabric Block 102d, the data could be transmitted first from Fabric Block 102a to Fabric block 102c via OCS 120a, and then from Fabric Block 102c to Fabric Block 102d via OCS 120b. Alternatively, data could be routed from Fabric Block 102a to OCS 120b, which could send the data directly to Fabric Block 102d.

As indicated above, each fabric block 102 includes a large number of servers 104. The servers 104 are arranged in server racks 106. A top-of-rack switch 116 routes data communications between servers 104 within a given rack 106 and from servers within the rack to servers in other fabric blocks 102 or to computing devices outside the datacenter 100 via the middle blocks 114.

The data center 100 also includes a controller 190. The controller 190 controls the internal connections of the OCSs 120, and thus determines how the middle blocks 114 of the datacenter 100 are interconnected. The controller 190 is configured to implement the methods described herein. For example, the controller 190 controls the transition from a first logical topology to a second logical topology. In some implementations, the controller 190 is implemented by special purpose logic circuitry (e.g., an FPGA (field programmable gate array), an ASIC (application specific integrated circuit)) or a general purpose computing device.

Figure 2:
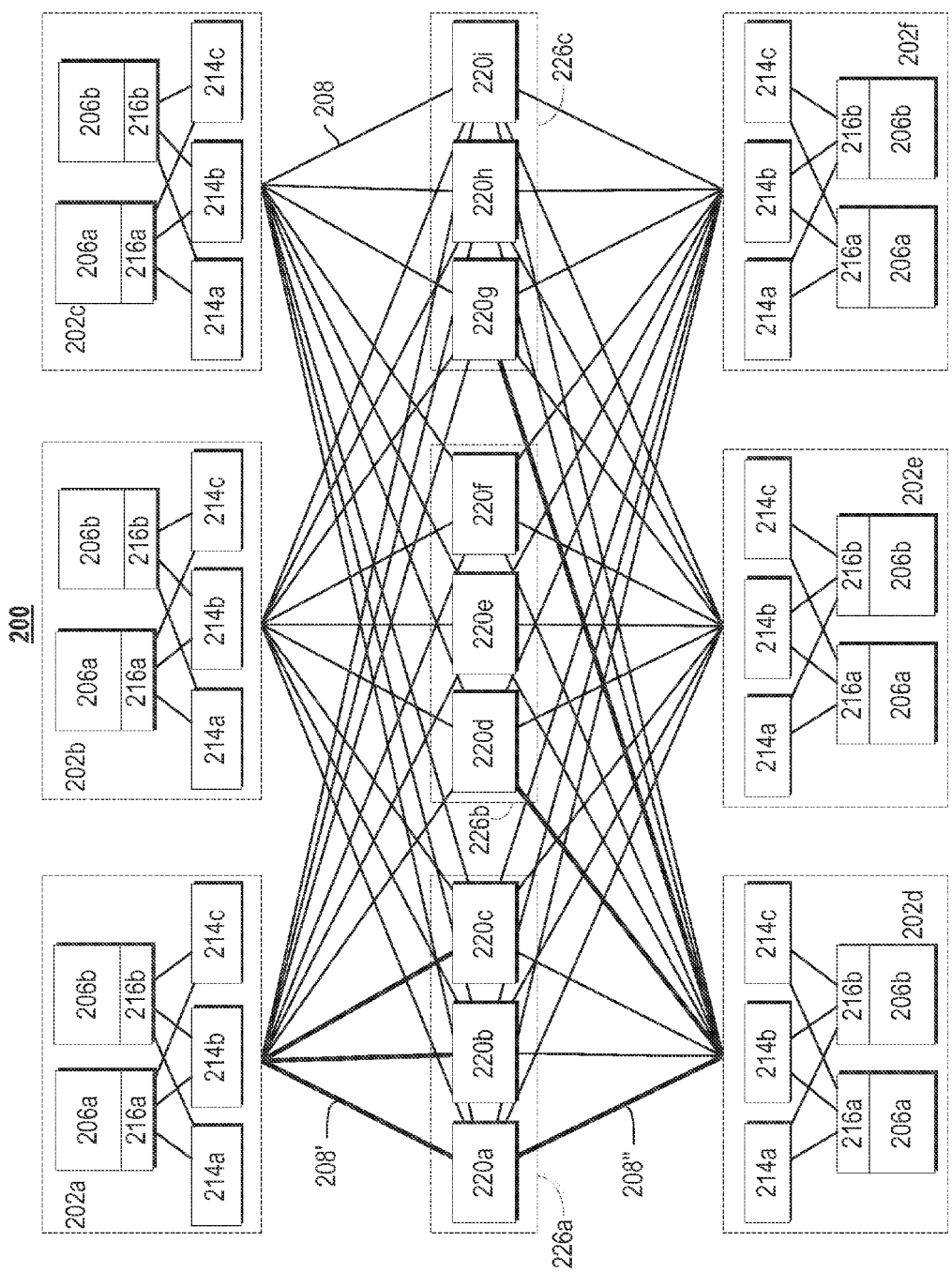
FIG. 2 illustrates a block diagram of an example network.

FIG. 2 illustrates a block diagram of an example network 200. The network 200 includes six fabric blocks 202a-202f (generally referred to as fabric blocks 202). Each fabric block 202 includes a two server racks 206a and 206b (generally referred to as server racks 206) coupled to a respective TOR switch 216a and 216b (generally referred to as TOR switches 216). The middle blocks 214a-214c (generally referred to as middle blocks 214) in each fabric block 202 couple to the TOR switches 216a and 216b and to at least one of the OCSs 220a-220i (generally referred to as OCSs 220). The plurality of OCSs 220 is divided into OCS groups 226a-226c (generally referred to as OCS groups 226). Each of the OCS groups 226 includes three OCSs 220.

The network 200 includes a plurality of fabric blocks 202, each of which includes a plurality of middle blocks 214. As illustrated, each of the fabric blocks 202 includes one middle block 214 for each of the OCS 220 in the OCS groups 226. In other implementations, each fabric blocks 202 can include more or fewer middle blocks 214 than the number of OCSs 220 in each OCS groups 226. The middle blocks 214 couple the fabric blocks 202 to the OCSs 220. The connections between the middle blocks 214 of each fabric block 202 to the OCSs 220 make up the physical topology of the network 200. The physical topology defines the two endpoints of each link 208. One end of each link 208 is coupled to a middle block 214 and the other end of the link 208 is coupled to an OCS 220. At a high-level or fabric-level view, the physical topology is an all-to-all connectivity between the fabric blocks 202 and the OCS 220. At a middle block-level, the physical topology is implemented by coupling each middle block 214 of a fabric block 202 to a predetermined number of OCS 220. For example, middle block 214 of fabric block 202a may be coupled to OCS 220a-OCS 220c of OSC group 226a (illustrated as bold links 208'). The middle block 214a of fabric block 202d may be coupled to OCS 220a of OSC groups 226a-226c (illustrated as bold links 208").

The network 200 also includes a plurality of OCSs 220 to communicatively couple the fabric blocks 202. As described above, the OCSs 220 include a number N of input/output ports. In some implementations, N is equal to the total number of fabric blocks 202 in the network 200. In other implementations, N is greater than or less than the total number of fabric blocks 202 in the network 200. Internally, each OCS 220 can couple any of its ports to any of its other ports, enabling communication between the two connected ports. The internal coupling of two ports enables the middle blocks 214 coupled to the two internally coupled ports of the OCS 220 to communicate with one another. For example, a first middle block 214 may be coupled to port 1 on an OCS 220 and a second middle blocks 214 may be coupled to port 8 on the same OCS 220. Internally coupling port 1 to port 8 would enable direct communication between the first middle block 214 and the second middle block 214. The direct connections of the fabric blocks 202 through the configured OCSs 220 define the logical topology of the network 200. Continuing the last example, the first middle block 214 is logically coupled to the second middle block 214.

Figure 3A:
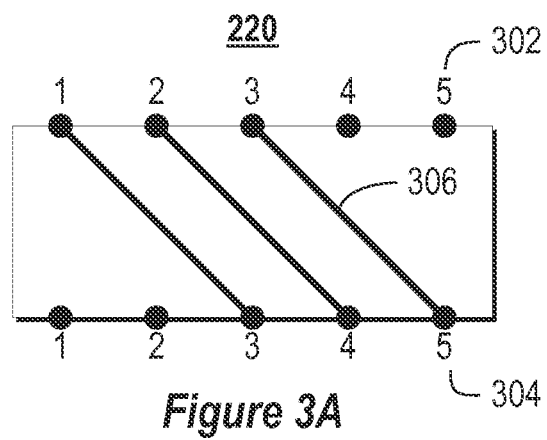
FIGS. 3A, 3B, and 3C illustrate example internal configurations that may be used in the optical circuit switches illustrated in the network of FIG. 2.
Figure 3B:
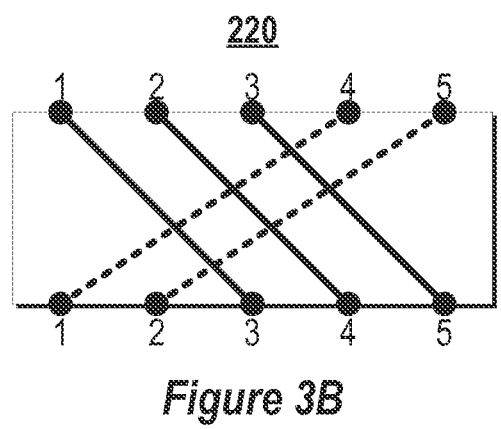
Figure 3C:
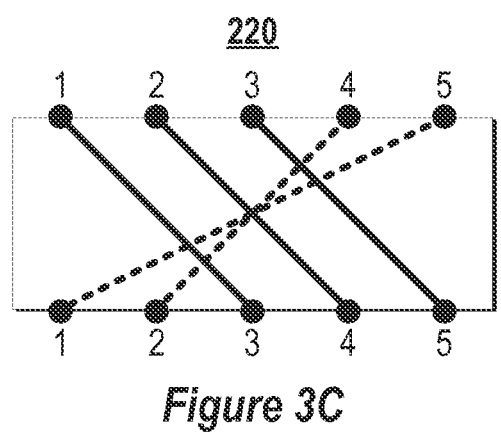

FIGS. 3A-3C illustrate example internal configurations that may be used in the OCSs illustrated in FIG. 2. For illustrative purposes, the OCSs 220 includes five north ports 302(1)-302(5) (generally referred to as north ports 302) and five south ports 304(1)-304(5) (generally referred to as south ports 304). In some implementations, each of the OCSs 220 include about 12, about 24, about 36, about 64, about 128 or more total ports. In some implementations, the internal links 306 between the north ports 302 and the south ports 304 have rotational symmetry. Rotational symmetry reduces the complexity of maintaining the logical topology of the network and in some implementations is straight forward to implement on OCSs. The rotational symmetry configuration is described as having a stride r, where r is the offset on the north port to the south port. More particularly, the i-th north port of the OCS 220 is connected to the $(i+r) \bmod(N/2)$ south port. In some implementations, the stride r is selected using the below described genetic algorithm. Rotational symmetry enables the logical connections between the middle blocks 214 coupled to an OCS 220 to be fully described by the links from a single middle block 214 to the OCS 220 because all middle block-middle block pairs are described by the (i+r) mod(N/2) equation. For example, if middle block 1 had k links to middle block 2, then middle block 3 has k links to middle block 4, etc.

FIG. 3A illustrates an example stride 2 configuration of an OCS 220. As illustrated, north port 1 is coupled to south port 3, north port 2 is coupled to south port 4, and north port 3 is coupled to north port 4. North ports 4 and 5 and south ports 1 and 4 are not configured and remain uncoupled. The fabric level topology is balanced by providing each fabric block 202 with x or x+1 links, where x=floor(uplinks per fabric block/(N−1)). In some implementations, the topology is balanced by taking the full-mesh between all fabric nodes 202 as many times as possible. For example, in FIG. 3A, x=1; however, if the OCS 220 included six north ports and six south ports x could be increased to two, providing each fabric block with two connections. In some implementations, as illustrated in FIG. 3A, after making a full-mesh as many times as possible one or more ports may be unused (because not enough ports remain to make another full-mesh graph). In such a circumstance, the remaining internal connections are randomly assigned.

FIGS. 3B and 3C illustrate example stride 2 configured OCSs 220, which include random internal connections. After generating as many full-mesh graphs as possible (one in this example) two north ports and two south ports remain unused. In this example, two random OSC configurations exist. The first, illustrated in FIG. 3B, includes a north port 4-south port 1 link and a north port 5-south port 2 link. The second random configuration, illustrated in FIG. 3C, includes a north port 4-south port 2 link and a north port 5-south port 1 link. In some implementations, some or all of the OCSs 220 include an offset stride configuration. The offset indicates at which port the stride configuration begins. For example, as illustrated in FIG. 3A-3C, there is no offset, and the stride configuration begins with port 1. If, for example, the offset was 1, the stride configuration would begin with port 2, and shift the stride configuration by 1. If FIG. 3A included a 1 port offset, north port 1, north port 5, south port 2, and south port 3 would be available for random interconnection. Briefly referring back to FIG. 2 as an example, each of the OCS 220 illustrated in FIG. 2 may include the stride 2 configuration illustrated in FIG. 3A, with a full OSC configuration as illustrated in FIG. 3B or FIG. 3C.

In some implementations, once the fabric-view logical topology is selected using the above described rotational symmetry plus random connection configuration, the middle block-level logical topology must be implemented. The middle blocks, as subcomponents of the fabric blocks, are not fully interconnected and have a limited radix. An initial logical topology for the middle block-level is implemented by default when implementing the fabric-view logical topology since at that point all available links are made. However, the middle block-level logical topology can be improved while maintaining the fabric-view logical topology by swapping OSCs that include different random configurations.

Figure 4:
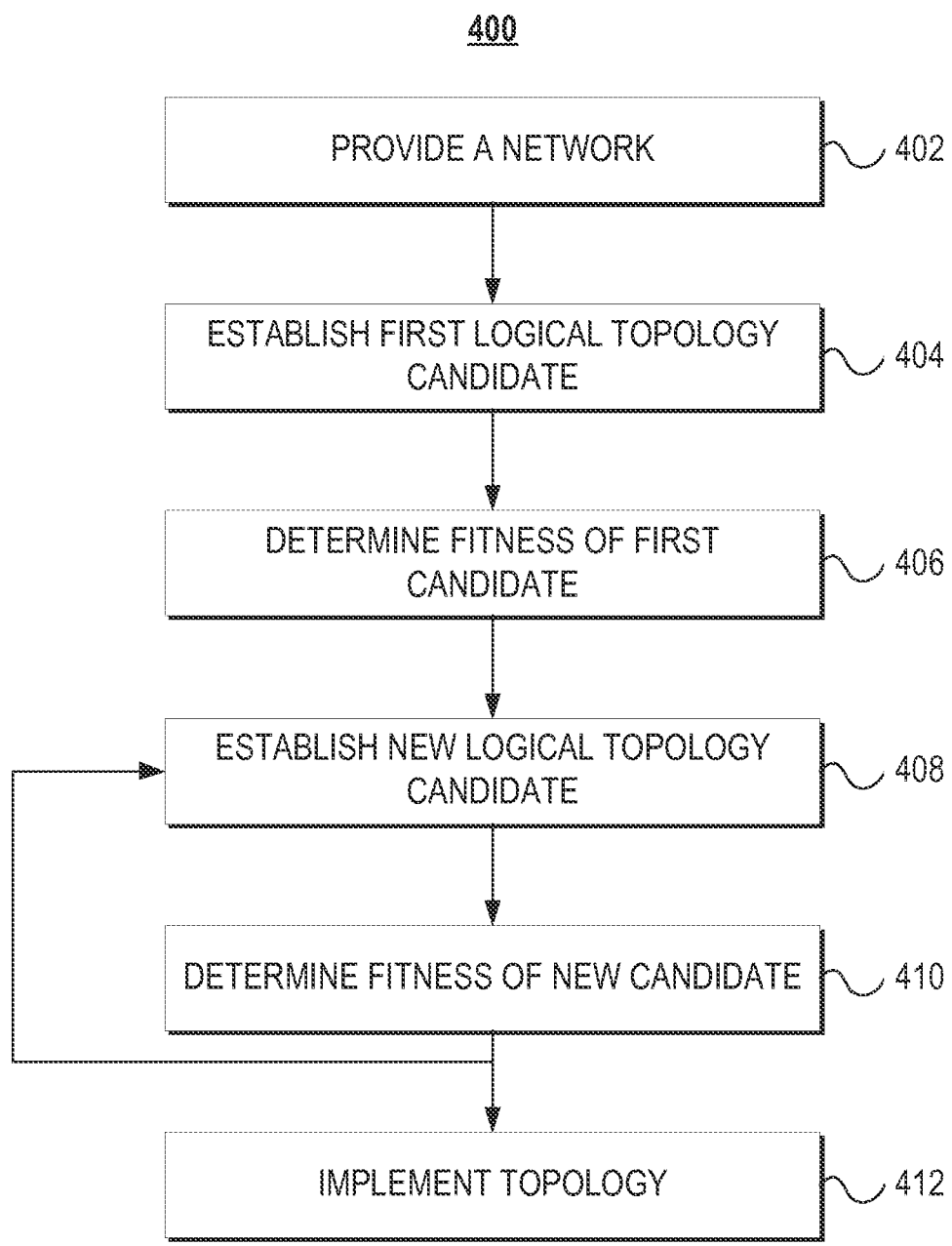
FIG. 4 illustrates a flow diagram of an example method for improving the logical topology of the network illustrated in FIG. 2.

FIG. 4 illustrates a flow diagram of an example method 400 for improving the logical topology of a network. The method 400 includes providing a network (step 402). A first logical topology candidate is established (step 404) and the fitness of the first logical topology candidate is determined (step 406). Then, a new logical topology candidate is established (step 408) and the fitness of the new logical topology candidate is determined (step 410). The steps 408 and 410 may be repeated a predetermined number of time before a logical topology candidate is implemented in the network as a logical topology (step 412). As used herein, establishing logical topology candidates includes deriving a logical topology as a computational model of the network without actively implementing the logical topology on a physical network. The fitness of the logical topology is evaluated on the computational model. For example, the method 400 can be executed by the above described controller, which can generate the computational models of the network and determine the fitness of each modeled logical topology candidate. In other implementations, the fitness of the logical candidate is evaluated by implementing the logical topology on a physical network and evaluating the fitness of the physical network in operation.

As set forth above, and referring to FIG. 2, the method 400 begins with the provision of a network. The network, as illustrated in FIG. 2, includes a physical topology defined by a plurality of fabric blocks 202 coupled together through a plurality of OCSs 220. Each of the fabric blocks 202 includes a plurality of middle blocks 214. The connections between the plurality of fabric blocks 202 and the plurality of OCS 220 are realized as connections between the different middle blocks 214 of each fabric block 202 and the OCSs 220.

Figure 5A:
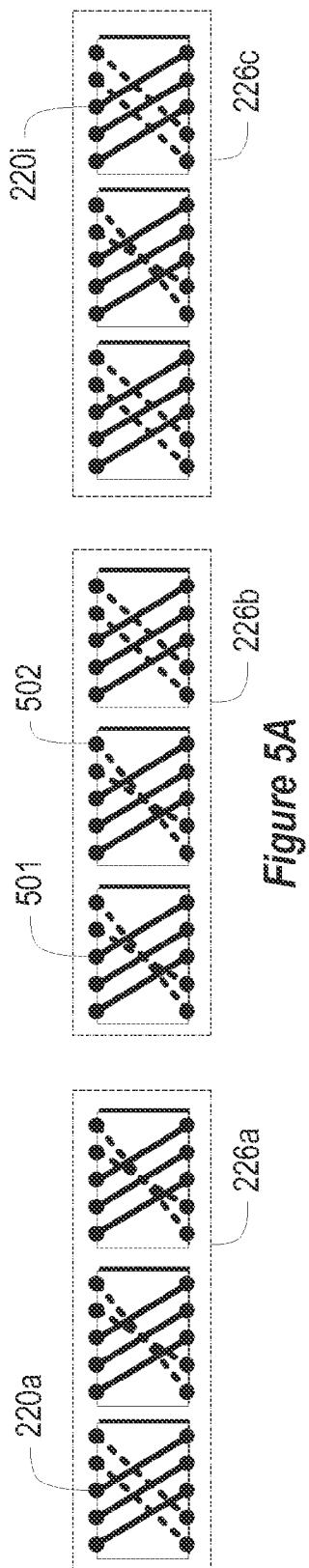
FIGS. 5A and 5B illustrate example configurations OCSs for the network illustrated in FIG. 2.

Next, and referring to FIG. 5A, a first logical topology candidate is established (step 404). Each of the OCSs 220 includes a stride r internal configuration. FIG. 5A illustrates an example configuration of each of the OCSs 220 from FIG. 2 implementing an example rotational symmetry plus random connection configuration. As illustrated, the OCSs 220 includes a stride 2 configuration. The ports unused after the generation of a full-mesh graph are randomly coupled to one another. In some implementations, randomly connecting the unused ports, provides a balanced network 200. The links established as part of the stride 2 configuration are illustrated as bold links 501. The randomly selected links are illustrated by links 502.

The method 400 also includes determining a fitness of the first logical topology candidate (step 406). In some implementations, the fitness of the logical topology candidate is determined by counting the number of 1-hop and 2-hop connections between all pairs of middle blocks in the network. For example, and referring to FIG. 2, if middle block 214a of fabric block 202a is connected to middle block 214a of fabric block 202d through OCS 220a then the pair is connected through a 1-hop connection in the logical topology. An example of a 3-hop connection would be if middle block 214a of fabric block 202a and middle block 214c of fabric block 202e are not directly connected but rather communications between the pair pass through middle block 214c of fabric block 202d and then middle block 214b of fabric block 202b before reaching middle block 214c of fabric block 202e. In some implementations, network balance is also factored into the fitness determination. Network balance relates to the equal distribution of links and hops. For example, a network where all nodes are connected by a 2-hop connection may be better balanced when compared to a network where all nodes are connected by 1-hop connections, except for one node pair that is connected by a 10-hop connection.

Figure 5B:
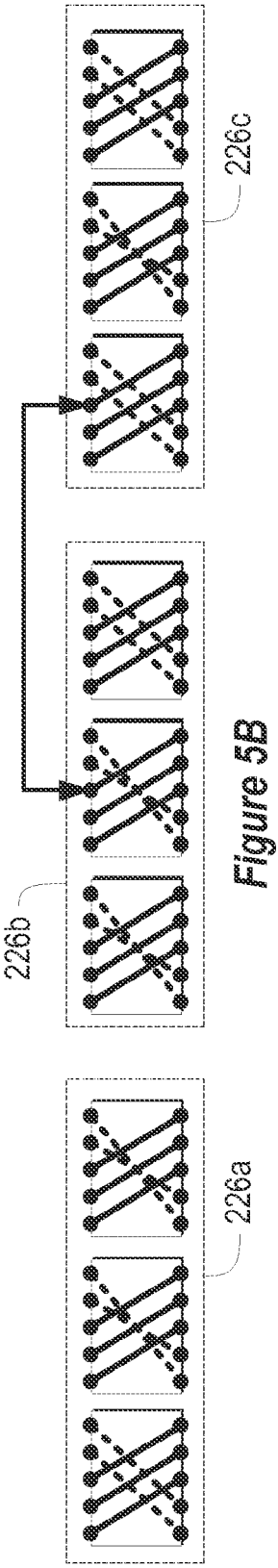

The method 400 also includes establishing a new logical topology candidate (step 408). In some implementations, the new (or mutated) logical topology candidate is established by exchanging the configurations of two of the OCSs in the network. FIG. 5B illustrates a mutated OCS configuration.

The OCS configuration illustrated in FIG. 5B is generated by swapping the OSC configuration of OCS 220*b* in OSC group 226*b* with the OCS configuration of OCS 220*a* from OCS group 226*c*. The selection of which OSC configurations to switch can be selected using a genetic algorithm that keeps a population of the tested logical topology candidates. For speed, in some implementations, OCS configurations are not exchanged within OSC groups 226. Efficiency of the method 400 is improved by not swapping isomorphic OCS configurations (e.g., OCSs that are configured to have the same internal configurations). In some implementations, a plurality of OCS configurations are swapped with each mutation of the network. For example, about 1 to about 10 pairs of OCS configurations, about 1 to about 5 pairs of OCS configurations, about 25% of the pairs of OCS configurations, or about 50% of the pairs of OCS configurations may be swapped to create a new network mutation. In some implementations, the process of establishing a new logical topology also includes changing the stride r of the network. For example, the controller may mutate through a first number of mutations with a stride r configurations, then a second number of mutations with a stride r+1 configuration, and so forth. In some implementations, a predetermined number of mutations are established at each stride r configuration possible on the OCSs and in other implementations mutations are only established on a subset of the stride r configurations possible on the OCSs.

The method further includes determining the fitness of the new topology (step 410). Like in step 406, above, the fitness of the new topology may be determined by counting the 1-hop and 2-hop pairs within the network and/or by measuring the balance of the network.

Responsive to determining the fitness of the new topology candidate, the method 400 may implement another topology candidate by again swapping OCS configurations and then determining the fitness of the newly mutated network. In some implementations, each mutation of the network is a mutation of the original topology candidate established in step 404 of the method 400. That is, the first topology candidate from step 404 is mutated into a new logical topology candidate at each iteration of the method. In other implementations, the previous mutation is further mutated at each iteration. In some implementations, a mutation is mutated at each iteration of the method until the fitness of the network decreases with respect to the previous mutation. For example, the first network topology candidate ($T_1$) is mutated to establish the second topology candidate ($T_2$), which is mutated to establish the third topology candidate ($T_3$), which is mutated to establish the fourth logical topology candidate ($T_4$). Assume, in this example, the fitness of a topology $T_x$ is provided by $F(T_x)$ and $F(T_4) > F(T_3) > F(T_2) > F(T_1)$. In this example, if $T_5$ (the mutation of $T_4$) is determined to have a fitness less than $T_4$, then the configuration of $T_4$ is saved and the method 400 may begin a new series of mutations with $T_1$. In some implementations, the network is mutated a predetermined number of times, until a predetermined level of fitness is achieved, or all possible mutations may be tested.

The method also includes implementing the logical topology candidate on the network (step 412). Once the network is mutated a predetermined number of times or until a predetermined level of fitness is achieved, the most-fit mutation is implemented in the network. To implement the logical topology candidate on the network, the controller sends the configuration to each of the OCSs in the network—for example using OpenFlow or another protocol. Responsive to receiving the logical topology configuration, each of the OCSs implements the configuration by interconnecting ports as indicated by the received configuration. In some implementations, the ports are interconnected by configuring light directors, such as micro-electro-mechanical systems (MEMS) with arrays of silicon mirrors, to deflect light between paired ports. In some implementations, the method 400 is repeated each time a new fabric block is added to the network or at predetermined intervals.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus.

A computer readable medium can be, or be included in, a computer-readable storage device, a computer-readable storage substrate, a random or serial access memory array or device, or a combination of one or more of them. Moreover, while a computer readable medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer readable medium is tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed:

1. A method for configuring a network, the method comprising:
    providing a network, network comprising:
        a plurality of optical switches, each of the plurality of optical switches having N ports including a plurality of north ports and a plurality of south ports, and a stride i+r internal configuration, where i and r are natural numbers, and each i-th north port of the optical switch is connected to a (i+r) mod(N/2) south port of the optical switch;
        a plurality of fabric nodes, each of the plurality of fabric nodes connected to each of the other plurality of fabric nodes through the plurality of optical switches;
    establishing a first logical topology candidate for the network, the first logical topology candidate assigning a respective switch configuration to each of the plurality of optical switches, each switch configuration indicating the internal interconnection between each of a plurality of ports of each of the plurality of switches;
    determining a first fitness of the first logical topology candidate;
    establishing a second logical topology candidate for the network by exchanging a switch configuration of a first optical switch of the plurality of optical switches with a switch configuration of a second optical switch of the plurality of optical switches;
    determining a second fitness of the second logical topology candidate; and
    implementing a network topology responsive to a comparison of the first fitness with the second fitness.

2. The method of claim 1, wherein an internal configuration of an optical switch in the plurality of plurality of optical switches includes at least one randomly configured connection.

3. The method of claim 1, further comprising iteratively establishing a predetermined number of logical topology candidates.

4. The method of claim 1, further comprising iteratively establishing a number of logical topology candidates until a predetermined fitness is achieved.

5. The method of claim 1, wherein the first and second fitnesses are measures of a number of hops in the network.

6. The method of claim 1, wherein the first and second fitnesses are measures of a balance of the network.

7. The method of claim 1, wherein the first and the second optical switch of the plurality of optical switches, whose switch configurations are exchanged, are selected using a genetic algorithm.

8. The method of claim 1, further comprising exchanging a switch configuration of a third optical switch of the plurality of optical switches with a switch configuration of a fourth optical switch of the plurality of optical switches and determining a third fitness.

9. The method of claim 1, wherein establishing the second logical topology further comprises exchanging a switch configuration of a third optical switch of the plurality of optical switches with a switch configuration of a fourth optical switch of the plurality of optical switch.

10. A system for configuring a network:
    a network, the network comprising:
        a plurality of optical switches, each of the plurality of optical switches having N ports including a plurality of north ports and a plurality of south ports, and a stride i+r internal configuration, where i and r are natural numbers, and each i-th north port of the optical switch is connected to a (i+r) mod(N/2) south port of the optical switch;
        a plurality of fabric nodes, each of the plurality of fabric nodes connected to each of the other plurality of fabric nodes through the plurality of optical switches;
        a controller coupled to each of the plurality of optical switches, the controller configured to:
            establish a first logical topology candidate for the network, the first logical topology candidate assigning a respective switch configuration to each of the plurality of optical switches, each switch configuration indicating the internal interconnection between each of a plurality of ports of each of the plurality of switches;

determine a first fitness of the first logical topology candidate;

establish a second logical topology candidate for the network by exchanging a switch configuration of a first optical switch of the plurality of optical switches with a switch configuration of a second optical switch of the plurality of optical switches;

determine a second fitness of the second logical topology candidate; and implement a network topology responsive to a comparison of the first fitness with the second fitness.

11. The system of claim 10, wherein an internal configuration of an optical switch in the plurality of plurality of optical switches includes at least one randomly configured connection.

12. The system of claim 10, wherein the controller is further configured to iteratively establish a predetermined number of logical topology candidates.

13. The system of claim 10, wherein the controller is further configured to iteratively establish a number of logical topology candidates until a predetermined fitness is achieved.

14. The system of claim 10, wherein the first and second fitnesses are measures of a number of hops in the network.

15. The system of claim 10, wherein the first and second fitnesses are measures of a balance of the network.

16. The system of claim 10, wherein the controller is further configured to select the first and the second optical switches of the plurality of optical switches using a genetic algorithm.

17. The system of claim 10, wherein the controller is further configured to exchange a switch configuration of a third optical switch of the plurality of optical switches with a switch configuration of a fourth optical switch of the plurality of optical switches and determine a third fitness.

18. The system of claim 10, wherein the controller is further configured to establish the second logical topology further by exchanging a switch configuration of a third optical switch of the plurality of optical switches with a switch configuration of a fourth optical switch of the plurality of optical switch.

* * * * *